UNITED STATES PATENT OFFICE.

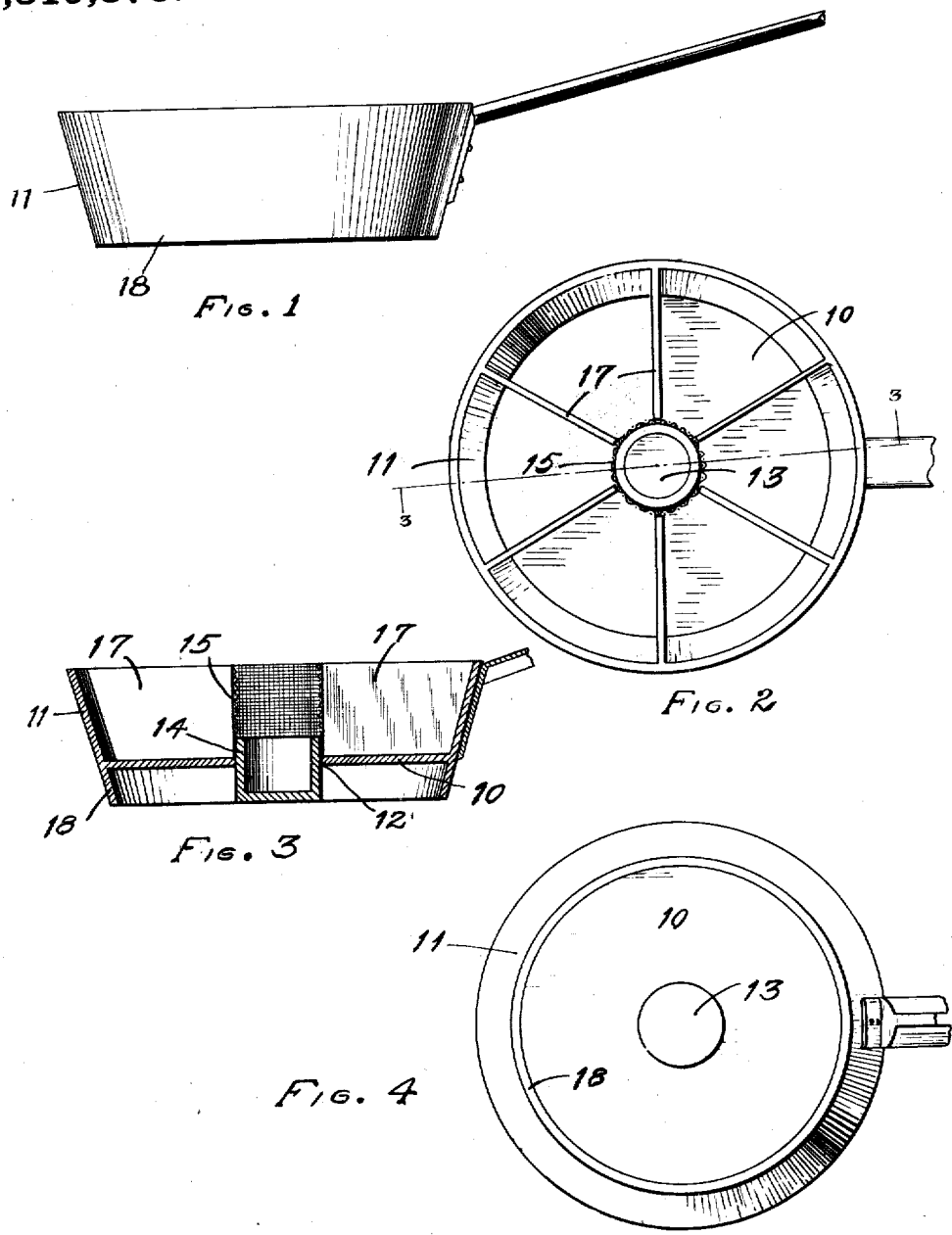

KENNETH A. LEWIS, OF SANDY CREEK, NEW YORK.

EGG-FRYING PAN.

1,319,878.  Specification of Letters Patent.  Patented Oct. 28, 1919.

Application filed November 18, 1918. Serial No. 263,043.

*To all whom it may concern:*

Be it known that I, KENNETH A. LEWIS, a citizen of the United States, residing at Sandy Creek, in the county of Oswego, State of New York, have invented certain new and useful Improvements in Egg-Frying Pans; and I do hereby declare the following to be a full, clear, and exact description of the invention, such as will enable others skilled in the art to which it appertains to make and use the same.

The invention relates to new and useful improvements in cooking vessels and particularly to frying pans for frying eggs.

One object of the present invention is to provide a novel and improved frying pan wherein a number of individual eggs can be fried without danger of running together.

Another object of the invention is to provide a novel and improved frying pan wherein there is provided a grease receptacle from which hot grease may be easily and quickly obtained to pour over the frying eggs to baste them.

A further object is to provide a novel and improved frying pan which includes a number of individual egg compartments and a central grease compartment into the latter of which the excess grease from the eggs in the different compartments will flow.

Other objects and advantages will be apparent from the following description when taken in connection with the accompanying drawing.

In the drawing:

Figure 1 is a side elevation of a pan made in accordance with my invention.

Fig. 2 is a top plan view of the same.

Fig. 3 is a vertical transverse sectional view taken on the line 3—3 of Fig. 2.

Fig. 4 is a bottom plan view of the pan, showing the supporting flange and the central grease cup or compartment.

Referring particularly to the accompanying drawing, the pan includes the bottom 10, from the peripheral edge of which there extends upwardly and outwardly the surrounding flange or wall 11. In the center of the bottom 10 there is formed an opening 12, circular in outline, and depending from the walls of this opening is a grease receptacle or cup 13. The surrounding walls of the cup extend upwardly a short distance above the upper face of the bottom of the pan, as shown at 14, and extending upwardly from the upper edge of this wall is an upwardly and outwardly flared surrounding screen wall 15. The portions 14 of the cup walls form the inner walls of the compartments of the pan, shown at 16, and which are separated from each other by the vertical and radially extending partition walls 17. In each of the compartments, surrounding the central cup, an egg is placed, and by reason of the walls 17 the eggs are kept from running together, and by reason of the walls 14 the eggs are prevented from running into the cup. The screen wall 15 effectively prevents the swelling egg from overflowing into the cup, while at the same time the excess grease from the different eggs is permitted to flow through this screen wall back into the central grease cup.

Depending from the outer side walls of the pan, and extending downwardly to a point in the plane of the bottom of the grease cup, is a flange 18 which serves to support the pan on the stove, and at the same time confines heat therewithin and around the grease cup, whereby said cup, and the contained grease will be kept in a very hot condition. Also, the bottom of the pan will be kept in a hotter condition than otherwise. Thus the usual practice of tilting the pan to scoop up the grease in the pan for the purpose of pouring the same over the frying eggs, to baste them, is obviated, as a plentiful supply of grease is contained in the cup from which it can be easily and quickly scooped out and poured over the eggs.

What is claimed is:

1. A frying pan having a central depression below the bottom of the pan and forming a grease receiving compartment, radiating partitions forming egg compartments between the depression and the rim of the pan, and straining means between the egg and grease compartments for permitting the passage of grease therebetween but preventing the escape of the eggs from the egg compartments into the central depression.

2. A frying pan having a central depression below the bottom of the pan and forming a grease compartment, a plurality of partitions extending from the wall of the depression to the rim of the pan, the surrounding wall of the depression extending a short distance above the bottom of the pan, and a reticulated wall extending upwardly from the upper end of the said surrounding wall and contacting with the inner ends of the said partitions.

In testimony whereof, I affix my signature, in the presence of two witnesses.

KENNETH A. LEWIS.

Witnesses:
 JAY L. UPTON,
 JAS. A. COOK.